United States Patent Office 2,910,374

Patented Oct. 27, 1959

1

2,910,374

COMPOSITION

Frank A. Simko, Jr., and Charles B. Thompson, Christiana Hundred, New Castle County, Del., assignors to E. I. du Pont de Nemours and Company, Wilmington, Del., a corporation of Delaware No Drawing. Application August 1, 1957
Serial No. 675,535

3 Claims. (Cl. 106—285)

This invention relates to novel colloidal-silica oil compositions which are especially adapted for application to textile fibers, and is more particularly directed to such compositions comprising an oil, an aqueous colloidal silica sol in which the silica is present as substantially non-agglomerated ultimate particles from 5 to 150 millimicrons in diameter, and an emulsifier for the oil, and preferably also a minor amount of a wetting agent. In a preferred embodiment of the invention the sol, oil and emulsifier are present as a mixture which is by visual examination a substantially clear, homogeneous system.

It has been recognized as desirable to increase the inter-fiber friction characteristics of spun textile fibers by applying to the fibers a sol of colloidal silica, followed by drying. This is taught in U.S. Patent 2,443,512, issued June 15, 1948, to Powers and Harrison. In the laboratory this can be accomplished without difficulty, but in the textile mill, when it is attempted to spray silica sols onto fibers, serious difficulties are encountered.

When cotton fibers are sprayed with colloidal silica sols, for instance, the silica after drying has a tendency to dust off the fibers and remain suspended in the air, thus constituting a health hazard. When it is attempted to combat this dusting by adding the conventional dust-laying materials such as hydrocarbon oils, the resulting mixture has a tendency to interfere with the proper operation of the fiber-handling machinery. Even more serious is the fact that, for reasons which are not entirely apparent, of the total silica employed only a relatively small fraction actually is deposited upon the fiber and a still smaller proportion is carried through to the yarn-spinning operation.

As a result, although the advantages to be gained from depositing silica on fibers such as cotton have been known for many years, there has been up to now relatively little commercial adoption of such fiber modification.

Now, according to the present invention it has been found that by mixing a silica aquasol, an oil, and emulsifier for the oil-aquasol under such conditions that the oil is apparently homogeneously dispersed in the aquasol, there is produced a novel type of composition which can be sprayed upon airborne fibers with a remarkable increase in the amount of silica which is deposited thereupon, with substantial improvement in the operation of the fiber-handling machinery, and with surprising increases in the strength of the yarn produced in the spinning operation. The nature of the compositions will be more fully described hereinafter, but the apparently important characteristic of the spray composition is that it be a substantially homogeneous, stable mixture, at least at the time of spraying.

Reference is made herein to one of the components of this composition as an "emulsifier." It will be understood that this term is used because it has connotations conventional in the art of making mixtures of aqueous substances and oily substances. However, applicants do not wish to be bound to the conventional concept insofar as their compositions are concerned. In their compositions, while both an aqueous material and an oily material are present, the form of the "emulsion" appears to be entirely novel. It appears that the silica of the aquasol has such a modifying influence on this system that the oil may not be merely a dispersion of droplets in the aqueous system as is the case with conventional emulsions. On the contrary, it appears that the emulsifier is associated with the silica and holds the oil in the mixture by attraction greater than the forces which ordinarily are found in dispersions of oil in water. It can be seen, therefore, that the term "emulsifier" is merely a convenient term to refer to the class of agents employed for maintaining the silica sol-oil mixtures in a substantially homogeneous condition and while they have the ability to emulsify the oil in very dilute silica sols and in water, they have a further ability to associate with the silica to produce hitherto unknown results.

2

The nature of the compositions of this invention will be most easily understood from the following discussion of the components going into the mixture.

THE SILICA AQUASOLS

The silica aquasol employed in a composition of the invention is a sol of substantially non-agglomerated particles, the freedom from agglomeration being sufficient that the relative viscosity, as measured at 10 percent $SiO_2$ and pH 10 is in the range from 1.15 to 1.55.

The ultimate silica particles in the sol appear substantially as spheroids on an electron micrograph prepared by diluting the sol to about 0.1 percent $SiO_2$ and observing the particles at about 50,000 diameters magnification. Ideally, the particles are substantially all in the form of such spheroids. The spheroids are from 5 to 150 millimicrons in diameter and preferably the diameter is from 5 to 30 millimicrons. A particular sol which has given especially good results contains particles of about 17 millimicrons diameter.

The ultimate particles of silica are dense, in that their surface area as determined by nitrogen adsorption is not greater than about 25 percent different from the surface area as calculated from direct observation on the electron microscope. Alkali-stabilized sols are especially useful, such sols being described, for instance, in Bechtold and Snyder United States Patent 2,574,902, Rule U.S. Patent 2,577,485 and Alexander U.S. Patent 2,750,345. All of these sols are characterized by being alkali-stabilized, the $SiO_2:Na_2O$ weight ratio in a preferred class of sols being from 60:1 to 500:1. Specifically, a sol of the above-mentioned Bechtold and Snyder patent having an $SiO_2:Na_2O$ weight ratio of about 90:1, containing substantially discrete particles of amorphous silica about 17 millimicrons in diameter and having a relative viscosity in the range of from 1.15 to 1.55 as measured at 10 percent $SiO_2$ and pH 10, and known commercially as "Ludox" is used in the most effective products.

THE OIL

The oil used in compositions of the present invention can be any animal, vegetable, synthetic, or mineral oil. A preferred oil is a hydrocarbon oil of the type used for spraying on cotton in cotton mills to allay dust problems. These are oils of relatively low viscosity and are widely available under such trade names as "Gulf Process Oil 37," "Faxam 35" and "Corvus Oil." A typical characterization of such an oil is as follows:

| | |
|---|---|
| Gravity A.P.I. | 31.3 |
| Viscosity, Saybolt mineral: | |
| @ 70° F. | 139. |
| @ 100° F. | 76.5 |
| @ 130° F. | 54.5 |
| @ 210° F. | 37.1 |

Flash O.C. ° F. _____ 355.
Fire O.C. ° F. _____ 405
Pour ° F. _____ +20
Color, ASTM Union D-155-45T _____ 1.25
Carbon residue, ASTM D 189-52 _____ 0.01
Neut. value, ASTM D 974-55T _____ 0.03

The oil may, of course, contain viscosity control agents and similar additives conventional in the trade. However, the oil should not contain water-soluble constituents which interfere with the stability of the ultimate product.

THE EMULSIFIER

The emulsifier used in a composition of this invention should be capable of holding the oil and the aquasol together in an apparently homogeneous system. By "apparently" is meant that the system by visual examination, appears to consist of only a single phase.

The emulsifier must be compatible with the silica sol—that is, it must not cause precipitation or gelation of the sol. Freedom from gelation can be determined by a simple test consisting of adding emulsifier to a stirred body of the concentrated silica sol until the sol gels. If the amount of emulsifier which can be so added exceeds the proportion of emulsifier ultimately desired in the final product it can be used. A portion of the emulsifier dissolves in the oil phase, and this appears to explain, in part, the stability of the compositions.

In the compositions of this invention the proportion of emulsifier is relatively high as compared with the proportion of emulsifier ordinarily used for making oil-in-water emulsions. It appears that the emulsifiers which are most effective are those which are capable of acting as emulsifiers for both oil-in-water and water-in-oil. It can be theorized that when the silica-sol:oil:emulsifier mixture is sprayed upon airborne cotton fibers it is an oil-in-water emulsion but that during the spraying a portion of the water vaporizes and the emulsion inverts to a water-in-oil emulsion. Applicants are not bound to this explanation for the effectiveness of their compositions, but it does appear to be in accord with the observed results.

Specifically, an extremely effective emulsifier can be selected from the group consisting of lauroyl diethanolamine amide and diethyleneglycol laurate. Of these, the former is particularly preferred.

Other emulsifiers which can be used are:

| Chemical Constitution | Trade Name | Ion Type |
|---|---|---|
| Diethanolamine condensate | Alrosol B | non- |
| Reaction product of coconut oil fatty acid amide with 5 moles ethylene oxide. | Ethomid C/15 | non- |
| Reaction product of fatty acid amide from hydrogenated tallow and ethylene oxide. | Ethomid HT/15 | non- |
| Sodium salt of a sulfoester of a fatty alkanolamide. | Oratol L 48 | an- |
| Coconut oil amine condensate | Ultrapole S | non- |
| Fatty acid alkanolamide | Eccanol A | non- |
| Polyethylene Glycol ester of fatty acids | Acco Emulsifier | non- |
| Alkyl aryl polyether alcohol | Agrimul 70–A | non- |
| Polyoxyethylene Sorbitan monooleate | Atlox 81 | non- |
| Glycol amido stearate | Cerasynt IP | non- |
| Polyoxyethylene glycol esters of coconut fatty acids. | Ethofat C–15 | non- |
| Polyoxyethylene glycol esters of rosin acids. | Ethofat 142–15 | non- |
| Aromatic polyglycol ether | Neutronyx 600 | non- |
| Mixed fatty acid (C–10 to C–16) akylol amine condensate. | Ninol 737 | non- |
| Glycerol mannitan laurate | NNO | non- |
| Polyoxyethylene sorbitan monolaurate | Tween 21 | non- |
| Diethylene glycol oleate | Witco DGO | non- |
| Glycerol Monooleate | Witco GMO | non- |

WETTING AGENTS

Compositions of the present invention are an important improvement over textile spray compositions heretofore available even when they are applied without wetting agent. However, a still further improvement is achieved by including in the composition a fourth component, namely, a wetting agent. A wetting agent serves to improve the wettability of the textile fibers by the compositions and the effect is synergistic, since the improvement is out of proportion to what would be expected from merely improving wetting characteristics.

The wetting agent used must be compatible with the three-component mixture, must not settle out or crystallize out or gel the silica or break the emulsion.

It will be understood that the emulsifier is a surface active agent and in many instances effectively improves the wetting of the fibers with the emulsion. However, the wetting agents herein referred to are in addition to any such wetting as may be contributed by the emulsifier.

Particularly effective as wetting agents in the compositions of this invention are those selected from the group consisting of dioctyl ester of sodium sulfo-succinate and trimethyl nonyl ether of polyethyleneglycol. Of these, the former has given particularly excellent results.

Other wetting agents which can be used are:

| Chemical Constitution | Trade Name | Ion Type |
|---|---|---|
| Diamyl ester of sodium sulfosuccinic acid | Aerosol AY | an- |
| Dihexyl ester of sodium sulfosuccinic acid. | Aerosol MA | an- |
| N-octa decyldisodium sulfosuccinamate | Aerosol 18 | an- |
| Bis(p-tert.-butyl phenoxyethyl) sodium sulfosuccinate. | Surface active agent BPETR. | an- |
| Alkyl polyoxyethylene amide | Antarox G–100 | non- |
| Polyoxyethylene lauryl ether | Brij 30 | non- |
| Polyoxyethylated fatty alcohol | Diazapon AN | non- |
| Alkyl aryl polyoxyethylene ether | Druterge ON | non- |
| Polyoxyethylene alkyl phenol | Energetic W–100 | non- |
| Nonyl phenoxy polyoxyethylene ethanol | Igepal CO–430 | non- |
| Sodium N-methyl-N oleoyl taurate | Igepon T–33 | an- |
| Polyoxyethylene tridecyl alcohol | Renex 30 | non- |
| Polyoxyethylene thio ether | Sterox SE | non- |
| Alkyl phenyl polyethylene glycol ether | Tergitol NP 27 | non- |
| Polyalkylene glycol ether | Tergitol XD | non- |

PROPORTIONS

The ratio of silica sol to oil in the compositions can vary from 3:1 to 10:1, by weight, and this ratio will remain substantially the same irrespective of the silica content of the sol provided the silica content is substantial—say above 5 percent $SiO_2$. Thus, an 9.3:1 ratio of sol to oil would not change materially whether the sol contained 15 or 25% $SiO_2$. Since the purpose is to apply as much silica as possible per unit of oil, it is obviously advantageous to employ a silica sol of maximum silica content. The "Ludox" colloidal silica sol above-mentioned contains about 30% $SiO_2$ and hence gives optimum results.

Sol-oil ratios of from 6:1 to 9:1 are preferred for textile spraying, and particularly excellent results have been obtained with ratios of 7:1 to 9:1, a specific example being 8.3:1.

As already mentioned the proportion of emulsifier is relatively high as compared with that originally found in systems of this type. The oil:emulsifier weight ratio can be broadly from .9:1 to 10.4:1. Especially desirable properties of stability, clarity and effectiveness are found with compositions in which the ratio is from 1:1 to 2:1. In a specifically preferred composition the ratio is about 1.7:1.

The proportion of wetting agent, when used, is very minor. It can be from .01% to 2% by weight based on the total weight of the composition. Ordinarily from .1 to .5% is all that is needed to give the desired result. In a particularly preferred mixture 0.1% has proven extremely effective.

The concentration of silica in the aquasol preferably is relatively high as above indicated. While even dilute sols are rendered effective by employing them in compositions of this invention it is preferred that the silica concentration of the aquasol employed in making the mixture be upwards of 10%. Ordinarily it will not exceed about 35–40%. From 20–35% $SiO_2$ concentration is especially practicable from the standpoint of economical spraying of the airborne fibers.

MAKING THE SILICA SOL-OIL MIXTURE

The compositions of the present invention can be made simply by mixing the silica sol, oil, and emulsifier in any order. As an example, the oil and emulsifier may be first mixed and agitated to insure homogeneous mixture. Wetting agent is dissolved in water, and this mixture is slowly added with agitation to the oil/emulsifier mixture. After the emulsion is formed, the colloidal silica is added with agitation.

The emulsion can also be made by premixing the oil and emulsifier, dissolving wetting agent in colloidal silica, and adding oil/emulsifier mixture directly to colloidal silica with agitation.

TREATMENT OF TEXTILE FIBERS

The compounds of this invention are especially adapted for application to textiles by spraying. Such spraying is most advantageously carried out while the fibers, such as cotton, are suspended in air, as in the pneumatic conveyor systems of cotton mills. The fibers are preferably passed through an expansion chamber at the point of application of the spray and it is also preferable to impinge the fibers upon a baffle in order to increase their turbulence. Regardless of the method of application of the spray, however, the proportion of the silica sprayed which is found on the fibers in the subsequently spun yarn is substantially higher than has hitherto been obtainable with compositions of the prior art.

In the processing of cotton fibers after spraying with a composition of this invention, the sprayed fibers are formed into a lap in the picking operation, following the usual cotton processing procedure. Laps containing approximately 50 lbs. of cotton are then carded into a sliver or continuous tow. This step simply orients the fibers and is equivalent to laying individual fibers in a parallel direction. No twisting is involved. A card sliver is then ganged from a number of individual slivers and redrawn into a single sliver still free of twists. This is primarily a mixing or a blending of fibers to give the desired end properties.

The sliver is then converted to roving on a roving frame. This operation consists of drafting the card sliver and providing a minimum amount of twist to produce a very coarse yarn suitable for handling on a spinning frame. Drafting refers to drawing the yarn down to a smaller cross-sectional diameter. The roving is then processed into yarn on a spinning frame where the major portion of twist is given to the yarn thereby resulting in the desired strength.

It is at this point that the frictional advantages of the treated stock are particularly apparent. These advantages show up in the ability to achieve either greater strength for the same amount of twist or to produce yarns at lower twists but higher rate. The spindles of the spinning frame revolve at an essentially constant speed (e.g. 7000 r.p.m.) and the amount of yarn built upon the spindle in a given time can be increased by increasing the speed of the front roller of the spinning frame. This in turn results in the production of a yarn of lower twist.

One of the extremely desirable advantages of the clear composition of the present invention is that its use reduces the number of "ends down" in the spinning operation. Ends down refers to the breaks of the yarn which is being spun. With the type of cotton fibers employed at a typical cotton mill and with the spindle speeds and other conditions which prevail there, the normal ends down is 70 to 90 per thousand spindle hours. For yarns made from fibers treated with the compositions of this invention, ends down can be cut to as low as 33 per thousand spindle hours. This results in a very substantial labor saving and also produces a more uniform yarn.

Yarn variation is measured as such in the normal processing of cotton. Actually, a treated yarn may give greater variation than an untreated yarn unless mechanical compensations are made for the fact that a frictionized fiber is being used. However, using a treated yarn wider adjustments can be made at the spinning frame to compensate for yarn variation because of the improved internal strength of the yarn itself. (For example, the weight of the traveler can be increased beyond that feasible with untreated staple.) This is one of the factors which helps to decrease the ends down obtained with the treated yarn.

Chemical analysis has shown that of the silica applied to the fibers, 60 to 95% reaches the lap, and 45 to 90% can be found in the finished yarn. By comparison, spraying with typical prior art compositions gave silica retentions less than 30% at the card sliver and still less in the final yarn.

The presence of the spray residue does not in any way deleteriously affect the yarn and, in fact, there are indications that certain of the properties of the yarn other than strength are actually enhanced. Thus, dyeing, sizing, cutting and similar operations are not adversely affected and in some instances improvement in dye characteristics can be noted.

The amount of silica which can be applied to a textile fiber according to a process employing a composition of this invention can be widely varied depending upon the enhancement of properties required. From 0.10 to 1.5% by weight of $SiO_2$ based upon the weight of the fiber will ordinarily give the desired results, about 0.3% being particularly preferred. These amounts refer to the amount actually deposited upon the fiber and, as above indicated, experience will show that a somewhat larger amount of silica will need to be sprayed in order to come out with the desired amount of deposit.

The invention will be better understood by reference to the following illustrative examples.

*Example 1*

A composition consisting of a silica aquasol, hydrocarbon oil, emulsifier and wetting agent was prepared as follows:

9.6 parts of hydrocarbon oil (Gulf Process Oil No. 37–Gulf Oil Co.) were charged to a mixing vessel. 7.2 parts of lauroyl diethanolamine amide (Ultrapole DL-Ultra Chemical Works) were added slowly with agitation. 19.1 parts of water premixed with 0.1 part of the dioctyl ester of sodium sulfosuccinic acid (Aerosol OT–American Cyanamid Co.) were then added slowly with agitation. Initially a water in oil system was made but as the balance of the water and succinate were added the system inverted to oil in water. The mixture was very viscous and thixotropic at the inversion point but lower in viscosity after the addition of the water and succinate. 64.0 parts of colloidal silica aquasol containing about 30% silica solids ("Ludox" HS Colloidal Silica—E. I. du Pont de Nemours & Co.) were then added to the oil in water system with agitation. The resulting mixture was low in viscosity. It was opaque due to entrapped air but became transparent in 0.5 to 1.0 hour.

Spray application of the above composition to blend of 1 inch raw cotton and waste cotton staple in a spray applicator inserted in the air suction line between the opening and picking operation of a cotton mill was carried out at an application ratio of 1.5 pounds of composition per 100 pounds of blended cotton. Treated fibers processed into yarn compared as follows to untreated staple:

| Fiber sample from— | Percent SiO₂ (Average of 2 analyses) ||
|---|---|---|
| | Untreated Fibers | Treated Fibers |
| Picker Hopper | 0.10 | 0.32 |
| Picker Lap | 0.08 | 0.20 |
| Card Sliver | 0.06 | 0.19 |
| Yarn | 0.06 | 0.18 |

*Example 2*

A composition containing about 20% silica was prepared as described in Example 1 from the following ingredients:

10.0 parts of hydrocarbon oil (Gulf Process Oil No. 37—Gulf Oil Co.) were charged to a mixing vessel. 3.3 parts of lauroyl diethanolamine amide (Ultrapole DL—Ultra Chemical Works) were added slowly with agitation. 0.1 part of the dioctyl ester of sodium sulfosuccinic acid (Aerosol OT—American Cyanamid Co.) were added to 19.9 parts of water with agitation until dispersed. This mixture was slowly added to the oil and amide, first forming a water in oil system and later an oil in water system. The system was viscous and thixotropic at the inversion point. 66.7 parts of colloidal silica aquasol containing about 30% silica solids ("Ludox" HS Colloidal Silica—E. I. du Pont de Nemours & Co.) were then added to the oil in water system with agitation. The resulting mixture was opaque and low in viscosity; it remained opaque.

Spray application of the composition described above to a blend of 1 inch raw cotton and waste cotton staple in a spray applicator located between the opening and picking operation of a cotton mill was done at a ratio of 1.55 pounds of composition per 100 pounds of blended cotton. Treated fibers processed into yarn compared as follows to untreated staple and to staple similarly treated by a formulation of the prior art:

| Fiber sample from — | Percent SiO₂ (Average of 2 analyses) |||
|---|---|---|---|
| | Untreated Fibers | Fibers treated with prior art formulation (0.3% SiO₂ applied) | Fibers treated with composition of this example (0.3% SiO₂ applied) |
| Picker Hopper | 0.12 | 0.25 | 0.33 |
| Picker Lap | 0.11 | 0.17 | 0.26 |
| Card Sliver | 0.07 | 0.12 | 0.19 |
| Yarn | 0.05 | 0.08 | 0.23 |

*Example 3*

A composition was prepared in the manner described in Example 1 from the following materials:

10.0 parts of hydrocarbon oil (Gulf Process Oil No. 37—Gulf Oil Co.) were charged to a mixing vessel. 3.3 parts of diethylene glycol laurate (Witco DGL—Witco Chemical Co.) were added slowly with agitation. 19.9 parts of water were mixed with 0.1 part of trimethyl nonyl ether of polyethylene glycol (Tergitol TMN—Carbide & Carbon Chem. Co.) in a separate mixing vessel. This mixture was slowly added to the oil and laurate with agitation. As the water and ether of polyethylene glycol were added, the system went from water in oil to oil in water. The mixture was very viscous and thixotropic at the inversion point. 66.7 parts of colloidal silica aquasol containing about 30% silica solids ("Ludox" HS Colloidal Silica—E. I. du Pont de Nemours & Co.) were then added to the oil in water system with agitation. The resulting mixture was low in viscosity and was opaque. It remained opaque.

Application of the above composition to a raw cotton-waste blend in the manner and amount described in Example 2 resulted in the following retention of silica:

| Fiber sample from— | Percent SiO₂ (Average of 2 analyses) |||
|---|---|---|---|
| | Untreated Fibers | Treated by Prior Art Formulation (0.3% SiO₂ applied) | Treated Fibers (0.3% SiO₂ applied) |
| Picker Hopper | 0.12 | 0.25 | 0.33 |
| Picker Lap | 0.11 | 0.17 | 0.26 |
| Card Sliver | 0.07 | 0.12 | 0.18 |
| Yarn | 0.05 | 0.08 | 0.19 |

*Example 4*

A composition containing about 25% silica was prepared in the following manner:

Twenty pounds of 31.3 Gravity A.P.I. hydrocarbon oil (Gulf Process Oil No. 37—Gulf Oil Co.) was charged to a mixing tank and thirteen pounds of lauroyl diethanolamine amide (Ultrapole DL—Ultra Chemical Co.) was added slowly and mixed thoroughly. The resulting clear amber mixture was then added to 167 pounds of colloidal silica aquasol containing about 30 percent silica solids ("Ludox" HS Colloidal Silica—E. I. du Pont de Nemours & Co.) under moderate mechanical agitation. To the resulting mixture was added 4 ounces of dioctyl ester of sodium sulfosuccinate containing 70% active ingredient (Aerosol OT, 70% solution—American Cyanamid Co.). The resulting mixture was opaque due to entrapped air which upon standing approximately thirty minutes yielded a clear straw colored mixture.

Application of the composition described above to a blend of raw cotton and waste cotton fibers in a spray chamber apparatus located between the opening and picking operation of a cotton mill was carried out at a ratio of 1.2 pounds of composition per 100 pounds of cotton blend. Treated fibers processed into commercial yarn in the conventional manner compared as follows to untreated fibers:

| Fiber sample from— | Untreated Fibers | Treated Fibers (0.3% SiO₂ applied) |
|---|---|---|
| Picker Hopper | 0.10 | |
| Picker Lap | 0.08 | 0.31 |
| Card Sliver | 0.07 | 0.25 |
| Roving | 0.06 | 0.18 |
| Yarn | 0.06 | 0.18 |

We claim:

1. A composition comprising an oil, an aqueous colloidal silica sol in which the silica is present as substantially non-agglomerated ultimate particles from 5 to 150 millimicrons in diameter, and an emulsifier for the oil, the sol, oil and emulsifier being present as a mixture which is by visual examination a substantially clear transparent, homogeneous system substantially free of creaming, the ratio of silica sol to oil being from 6:1 to 9:1 and the ratio of oil to the emulsifier being from .9:1 to 10.4:1 by weight.

2. A composition especially adapted for application to textile fibers, the composition comprising a hydrocarbon oil, a colloidal silica sol characterized by being alkali stabilized with an amount of a sodium base such that the SiO₂:Na₂O weight ratio is about 90:1 the colloidal sol containing substantially discrete particles of amorphous silica about 17 millimicrons in diameter and being sufficiently non-agglomerated that the relative viscosity as measured at 10% SiO₂ and pH 10 without the oil present is in the range from 1.15 to 1.55, an emulsifier for the oil-silica sol system selected from the group consisting of lauroyl diethanolamine amide and diethyleneglycol laurate, and a wetting agent selected from the group consisting of dioctylester sodium sulfosuccinate and trimethyl nonyl ether of polyethylene glycol, the ratio of silica sol to oil being from 6:1 to 9:1 and the ratio of oil to the emulsifier being from .9:1 to 10.4:1 by weight.

3. A composition comprising about 83.4 parts by weight of a colloidal silica aquasol containing 30% $SiO_2$, in the form of substantially discrete dense amorphous particles of silica about 17 millimicrons in diameter stabilized with an amount of sodium base such that the $SiO_2$:$Na_2O$ weight ratio is about 90:1, about 10.0 parts by weight of a hydrocarbon oil of low viscosity, about 6.5 parts by weight of lauroyl diethanolamine amide as an emulsifier, and about 0.1 part by weight of dioctyl ester of sodium sulfosuccinate, the composition being an apparently homogeneous mixture by visual examination.

References Cited in the file of this patent

UNITED STATES PATENTS

| | | |
|---|---|---|
| 2,096,749 | Kritchevsky | Oct. 26, 1937 |
| 2,316,234 | Flett | Apr. 13, 1943 |
| 2,590,659 | Skalkeas | Mar. 25, 1952 |
| 2,609,381 | Goldstein et al. | Sept. 2, 1952 |
| 2,806,804 | Davis et al. | Sept. 17, 1957 |